United States Patent
Paya et al.

[11] Patent Number: 5,951,215
[45] Date of Patent: Sep. 14, 1999

[54] POLYGONAL COTTING INSERT

[75] Inventors: José Agustin Paya, Mülheim; Dirk Retzkowski, Gelsenkirchen; Klaus Rödiger, Bochum, all of Germany

[73] Assignee: Widia GMBH, Essen, Germany

[21] Appl. No.: 08/983,368

[22] PCT Filed: May 7, 1996

[86] PCT No.: PCT/DE96/00844

§ 371 Date: Jan. 15, 1998

§ 102(e) Date: Jan. 15, 1998

[87] PCT Pub. No.: WO97/05981

PCT Pub. Date: Feb. 20, 1997

[30] Foreign Application Priority Data

Aug. 5, 1995 [DE] Germany .......................... 195 28 851

[51] Int. Cl.$^6$ ................................................. B23B 27/02
[52] U.S. Cl. ......................................... 407/113; 407/114
[58] Field of Search ...................................... 407/113–116

[56] References Cited

FOREIGN PATENT DOCUMENTS 3730943  4/1989  Germany ................................ 407/113

*Primary Examiner*—Andrea L. Pitts
*Assistant Examiner*—Mark Williams
*Attorney, Agent, or Firm*—Herbert Dubno; Andrew Wilford

[57] ABSTRACT

A polygonal cutting insert is formed with a polygonal cutting face, an opposite support face generally congruent and generally parallel to the cutting face, and a plurality of generally planar side faces extending generally transversely between the cutting and support faces and meeting at corners. The side faces and corners define a cutting edge at a periphery of the cutting face and each side face is formed by at least two side-face regions extending parallel to each other and to the cutting and support faces and forming respective different side angles with the cutting face. Respective corner surfaces extending between the cutting and support faces at the corners each extend between a respective pair of side faces. Each such corner surface has a predetermined width that is greatest at the support face.

15 Claims, 6 Drawing Sheets

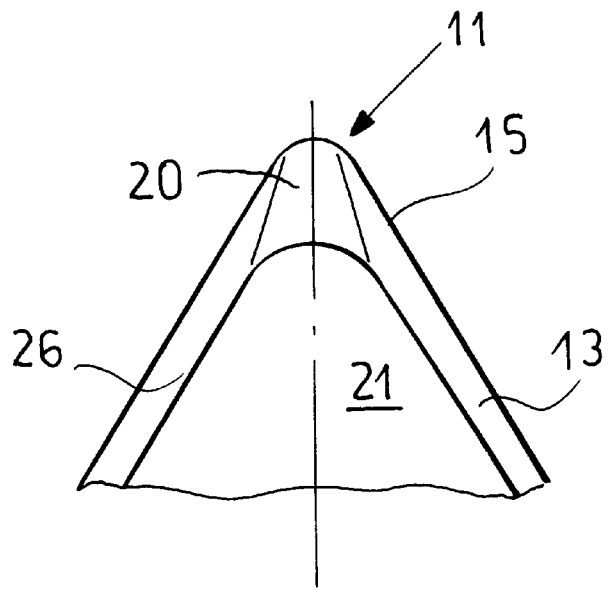
FIG. 8a
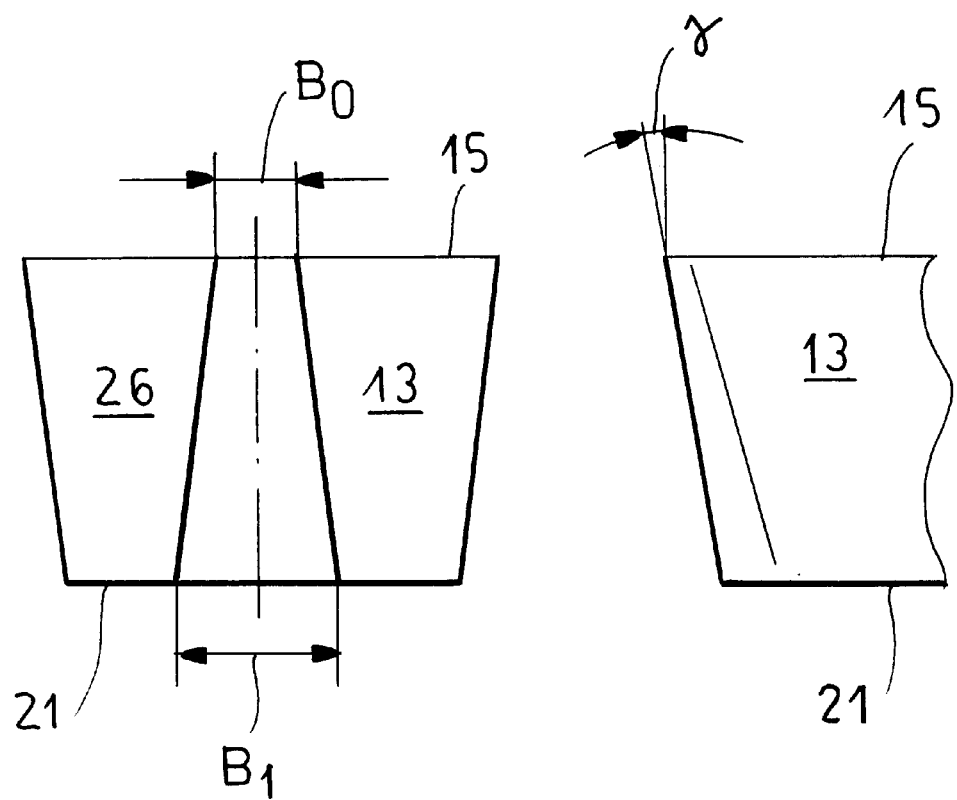
FIG. 8b
FIG. 8c

POLYGONAL COTTING INSERT

CROSS REFERENCE TO RELATED APPLICATIONS

This application is the US national phase of PCT application PCT/DE96/00844 filed May 7, 1996 with a claim to the priority of German application 195 28 851.3 filed Aug. 5, 1995.

FIELD OF THE INVENTION

The invention relates to a polygonal cutting insert with a cutting faces a support face, and a plurality of side faces that together with the cutting face form cutting edges and rounded or chamfered cutting corners below which the adjacent side-face regions border one another over a shape corresponding to the cutting-corner shape.

BACKGROUND OF THE INVENTION

European 0,160,278 describes and illustrates such a cutting inserts This cutting insert has below the cutting edge and spaced therefrom a side-face region reaching to the support face that is set back relative to the overlying side-surface region that goes to the cutting edge.

In addition cutting inserts, in particular rhombic cutting inserts with acute-angle corners, are known which have on the side face at a spacing from the cutting edge below the corner region a set-back side face produced by machining. The transition regions between two adjacent side-face sections run together at an ever acuter angle toward the support face or have seen in section a constant corner radius of the transition regions between two side faces.

The disadvantage of the above-described cutting inserts is that they either have very small corner radiuses below a cutting-insert support face at a cutting corner, so that there is the danger of breakage, -or with set-back side-face transition regions the support face is made very small which reduces the stability of an indexable cutting place installed in a tool holder. As the side-face regions are worn off increased costs and labor are encountered Corner regions with small radiuses in the region of the support face are very hard to manufacture by pressing.

OBJECT OF THE INVENTION

It is therefore an object of the present invention so to improve the above-described cutting insert that it has greater edge stability in the region of the side-face edges in particular in the transition region of two adjacent side faces near the support face.

SUMMARY OF THE INVENTION

This object is achieved by the polygonal cutting insert according to claim 1 which is characterized in that a corner surface or transition region between two adjacent side faces has in a region adjacent the support face a maximum width at least relative to the width of overlying regions. With this simple expedient that can be produced relatively easily by press technology through appropriate formation of a mold one gets a more stable mounting of the cutting plate in the transition region of two side faces that does not deleteriously affect the formation of the geometry of the cutting edge and the cutting corners As a result of the features of the invention, fracture failure of the cutting insert in the side face region bordering on the support face is avoided.

Thus according to a first embodiment of the invention the width of the transition region (of two adjacent side faces) increases continuously from the cutting face to the support face. According to an alternative embodiment the width of the transition region is at first constant from the cutting face to the support face and then increases uniformly and/or step-wise. This embodiment includes such embodiments wherein the width of the transition region only increases over a certain distance continuously to the support face while there is always the requirement that the width of the transition region in the region is maximum in the region of the adjacent support face.

In a further embodiment of the cutting insert according to the invention the width of the transition region increases below a spacing of at least 20% of the cutting-insert height.

Preferably the maximum width is 1.1 to 3 times preferably 1.1 to 1.8 times, as large as the minimum width of the transition region. This minimal width can either be defined at the region adjacent the cutting edges namely when the transition region there to the support face widens or at a spacing from the cutting edge such hat the width of the transition region toward the support face at first decreases or remains constant and then again increases toward the support face.

In section transverse to the side face or the side-face region of the transition region the transition region has a cross-sectional rounding with a constant radius so that the cross-sectional rounding merges tangentially in the planar adjacent side-face regions or intersects same, preferably while forming a smaller cross-sectional radius.

Alternatively the transition region is substantially formed by one or more lands that preferably are each rounded off at the edge of the next land or to the planar adjacent side face.

Finally in an alternative embodiment the transition region is formed in section as lateral convex parts and a central concave rounded part.

The side faces below the cutting edge—except for the transition region—can be formed as respective planar surfaces and can still be formed of vertically offset planar surfaces that are arranged at different side angles Correspondingly then the respective free angles are formed in the adjacent transition regions. This free angle preferably lies between 5° and 10°. According to a further embodiment of the invention the side angle at the cutting edge is between 5° and 10° and the side angle at the support face is 10° to 20°. With three vertically offset side-face sections the side angle of the central side-face region and/or of the transition region lies between 20° and 45°.

The above-described embodiment is preferably used with cutting inserts wherein at least one cutting corner is formed as a sharp point preferably with an apex angle $\leq 80°$.

The polygonal cutting insert can have any desired cuttingface shapes in particular it can be formed with chip-shaping grooves, limiting lands on the cutting edge, and/or raised chip-shaping elements Preferably these ridge-shaped chip-shaping elements extend generally toward the cutting corner and are formed as elongated ridges Such raised chip breakers are described for example in German 4,136,417 or German 4,314,570 to which reference is made.

BRIEF DESCRIPTION OF THE DRAWING

Embodiments of the invention are shown in the drawing and are described in the following. Therein:

FIG. 8a is a bottom view perpendicular to the support face of a cutting corner;

FIGS. 8b to 8g are respective end and side views of possible embodiments of the transition region of the cutting edge;

SPECIFIC DESCRIPTION

Figure 1:
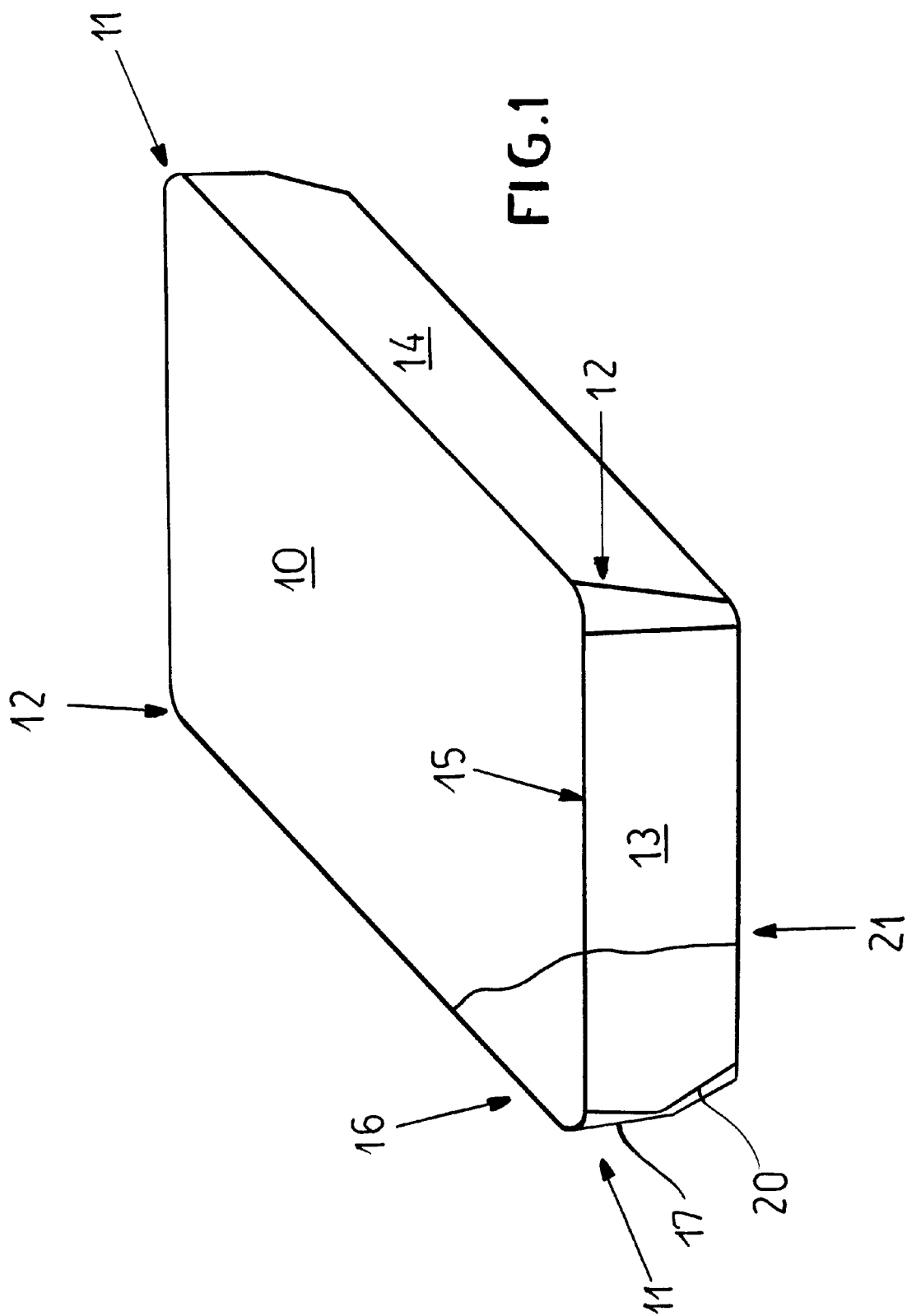
FIG. 1 is a perspective view of a rhombic cutting insert in a schematic view.

FIG. 1 shows a cutting insert (without chip-shaping elements) that has a rhombic cutting face 10 with two acute-angle cutting corners 11 and two obtuse-angle cutting corners 12. The respective adjacent side faces 13 and 14 and the cutting face 10 together form an annular cutting edge 15. In the following a corner portion 16 of such a cutting insert is dealt with.

Figure 2:
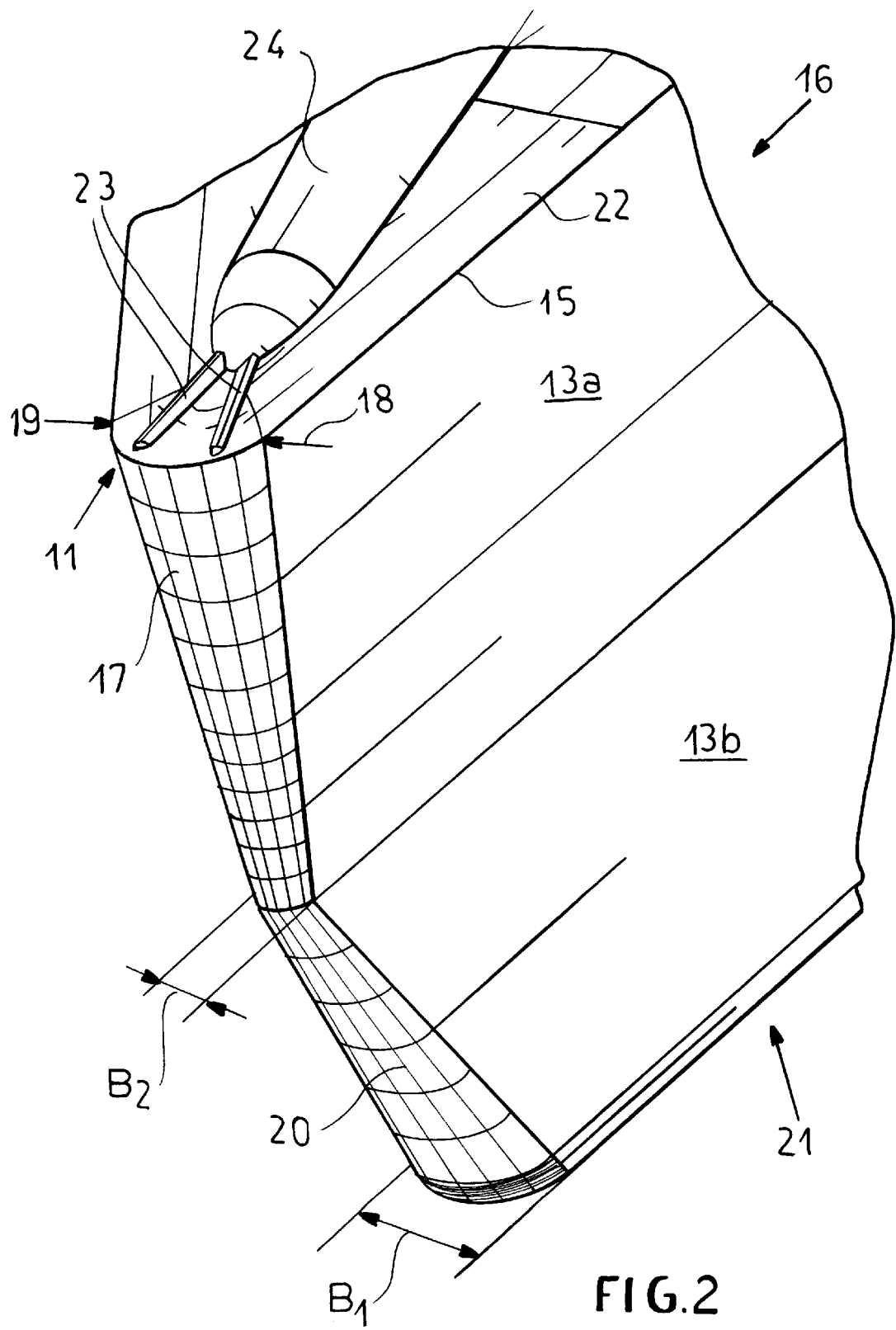
FIG. 2 is a detail view of this cutting insert in the region of a cutting corner.

As shown in the wire-line view of FIG. 2, the cutting insert has two side-face regions 13a and 13b set at different free-face angles above one another. The cutting corner 11 is rounded and has a generally constant radius of curvature which is the same as the radius of curvature of the convexly shaped transition region 17 in the regions near the cutting corner. The transition region 17 forms at the annular cutting edge 15 a connecting region between two adjacent side-face regions of which the side-face region 13a is shown and the adjacent side-face region is covered in FIGS. 1 and 2. The space between arrows 18 and 19 is the upper width dimension of this transition region. As shown in FIG. 2 the width of this transition region 17 decreases from a starting width to a width $B_2$. This width is measured level with the border between the side-face sections 13a and 13b. Below this border the actual width of the side-face region increases to the dimension $B_1$ measured in the region of the border between the transition region 20 or of the lower side-face region and the support face 21. FIG. 2 shows that an annular groove 22 runs along the cutting edge and is crossed by raised ridge-shaped chip-shaping elements 23 that here are set symmetrical to a bisector of the cutting corner. These longitudinal ribs merge at their ends remote from the cutting corner with a taller ridge 24. As further shown in FIG. 3, the border 25 where the width B2 is measured lies at a spacing A below the cutting edge 15 or the cutting corner 11. This dimension A is equal to at least 20% of the spacing between the cutting face 10 and the support face 21.

Figure 3:
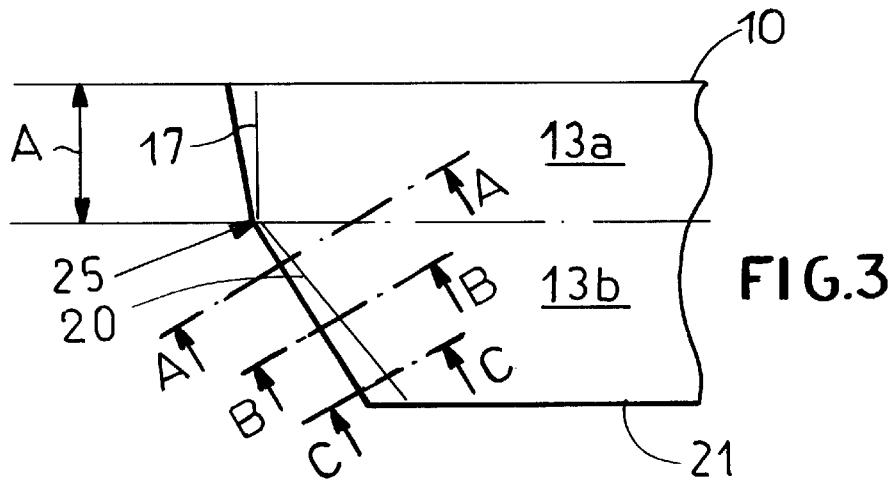
FIG. 3 is a side view of the detail of FIG. 1 on a side face.

FIGS. 4 to 7 are sections taken along lines A—A, B—B, or C—C of FIG. 3 which show congruent shapes that are only different with respect to the width dimensions $B_2$ to $B_1$ that increase toward the support face. In FIGS. 4 to 7 the starting width is at the level of the section line A—A which lies between the described limit values. These figures show what edge shapes the adjacent lower side-face sections 13b and 26 have. The transition region corresponds to the region 20 of FIGS. 1 or 2.

Figure 4:
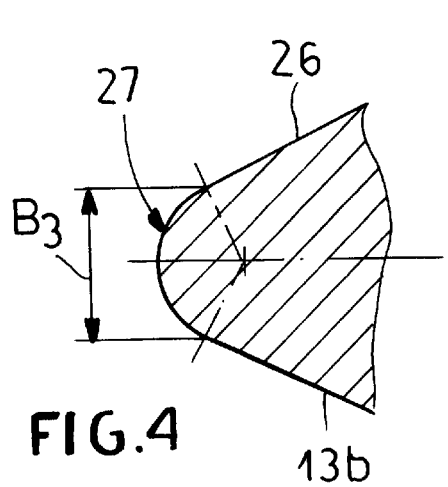
FIGS. 4 to 7 are alternative embodiments taken along section lines A—A, B—B, or C—C.
Figure 5:
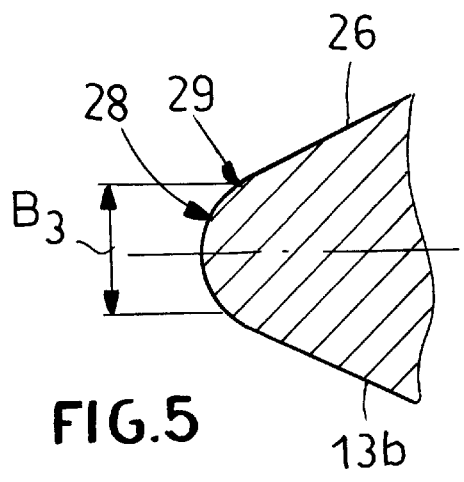
Figure 6:
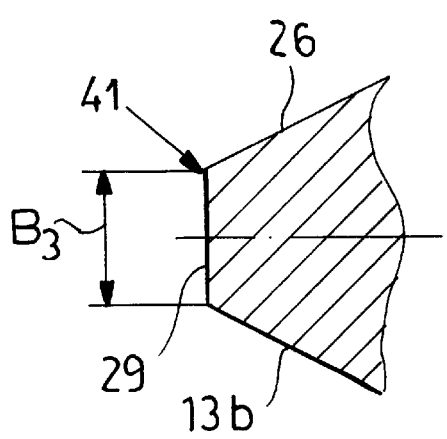
Figure 7:
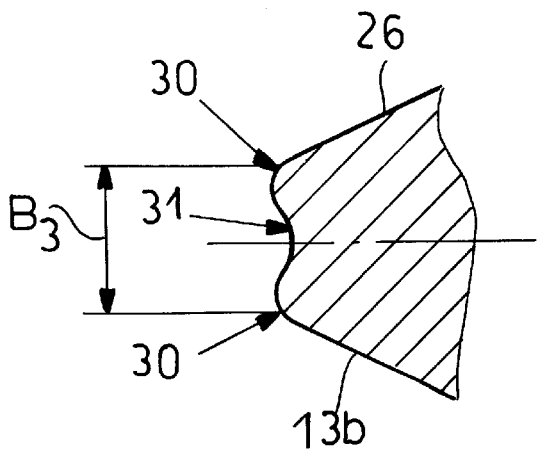

In FIG. 4 the transition region has a constant corner radius of curvature that merges tangentially into the adjacent side-face regions 26 and 13b. FIG. 5 shows that the constant radius 28 can merge via a rounded edge 29 into the side-face regions 26 and 13b; the actual corner radius 28 thus forms cutting edges at the border 29. FIG. 6 shows an embodiment wherein the transition region 29 is formed by a land. As shown in FIG. 7 the transition region can have two lateral convex round parts 30 and a central concave round part 31. With all of these transition-region embodiments the region is of maximum width at the support surface 21, that is the width dimensions of sections A—A, B—B, and C—C increase uniformly to the lower edge.

Figure 8D:
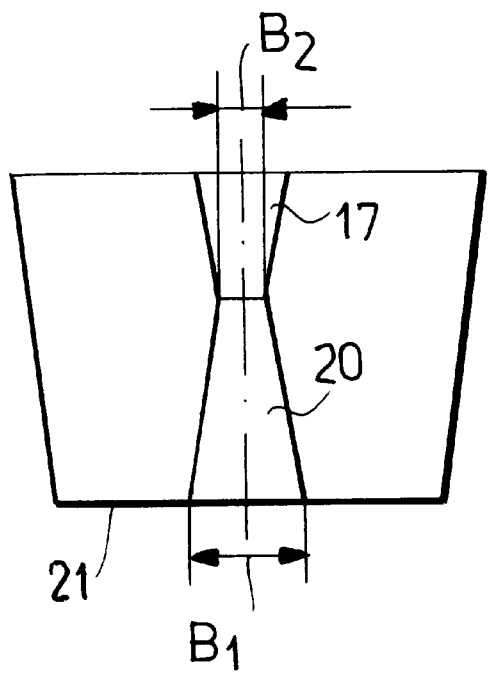
Figure 8E:
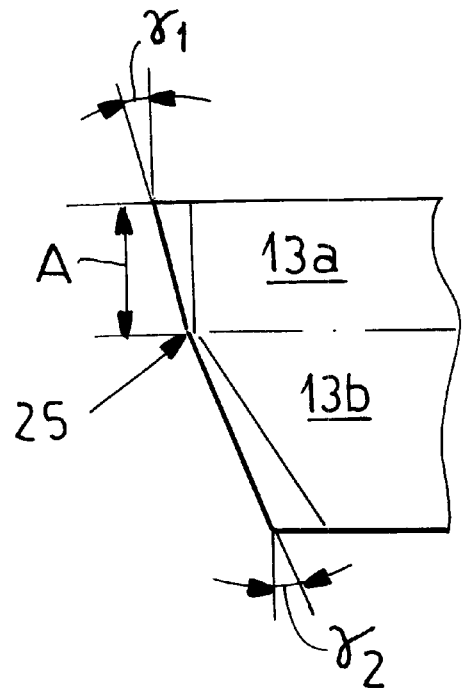

FIG. 8a shows a plan view on the support face 21 with a transition region decreasing toward the cutting edge 15 or cutting corner 11. As FIGS. 8b and c show, the increase of the width from a starting dimension $B_0$ at the cutting edge produces a continuous increase to the lower dimension $B_1$. Thus the cutting insert has two planar side faces 13 and 26 defining an angle λ. In the FIG. 8d embodiment which corresponds to the view of FIGS. 1 to 3, the width of the upper part of the transition region 17 decreases from a starting dimension to the illustrated dimension $B_2$. The width of the adjacent transition region 20 increases uniformly to the edge at the support face 21 to the dimension $B_1$. The cutting insert has two respective planar and vertically offset sideface regions 13a and 13b of which the upper side-face region is set at a side angle $\gamma_1$ and the lower side-face region is set at a larger side angle $\gamma_2$.

Figure 8F:
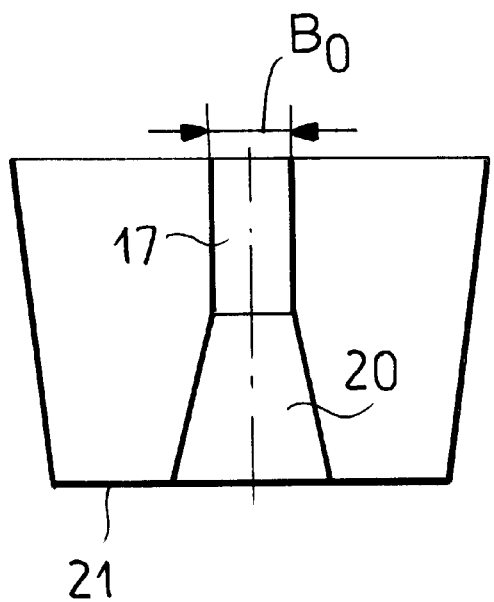
Figure 8G:
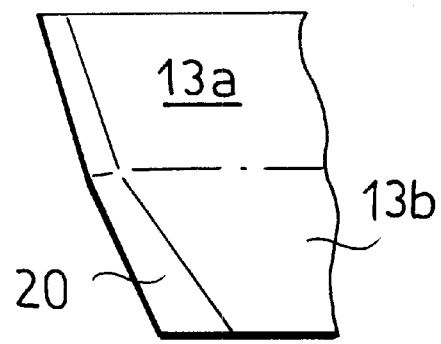

In the arrangement according to FIGS. 8f and 8g where the height of the side-face sections 13a and 13b is about the same, the transition region 20 is also formed such that it increases in size continuously toward the support face 21 while the width $B_0$ in the upper transition region 17 that runs to the cutting edge 11 is constant.

Figure 9A:
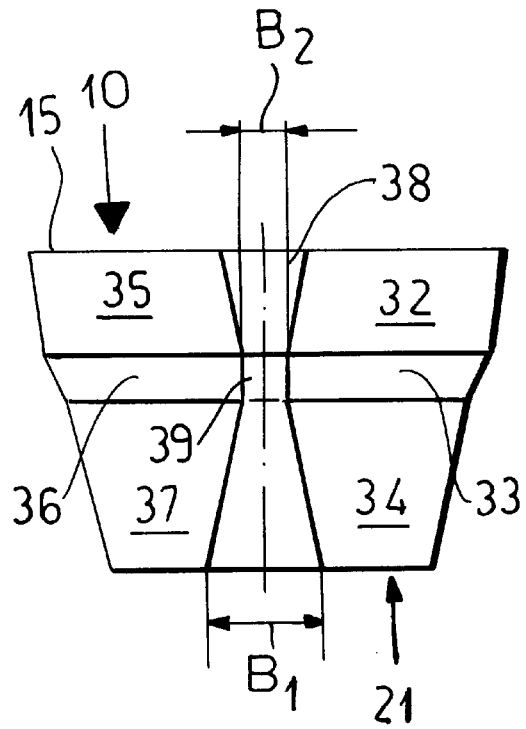
FIGS. 9a and 9b are end and side views of another cutting insert according to the invention.
Figure 9B:
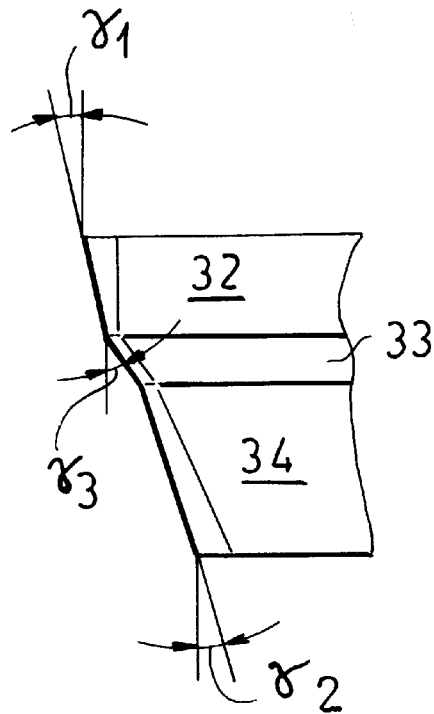
Figure 9C:
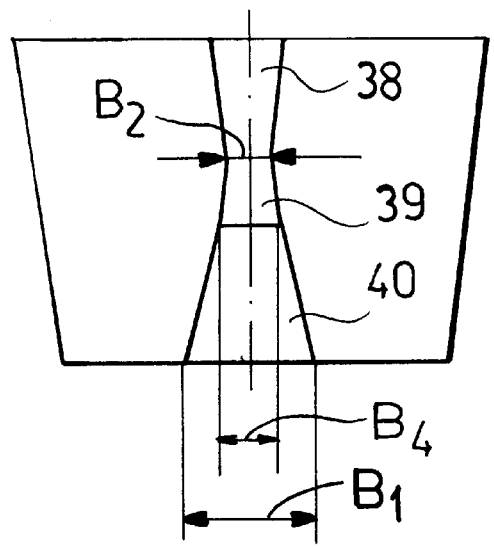
FIGS. 9c and 9d are views like FIGS. 9a and 9b of yet another cutting insert.
Figure 9D:
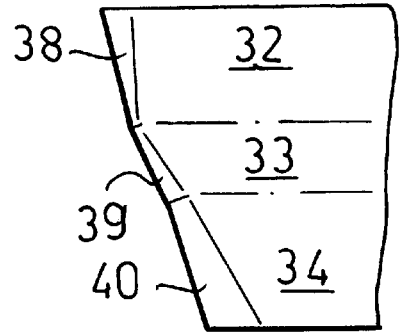

FIGS. 9a to 9d shows variations of the cutting insert with three vertically offset side-face regions that lie at respective different cutting angles $\gamma_1$, $\gamma_2$, and $\gamma_3$. The vertically offset sideface regions 27 to 29, 30 to 32, 32 to 34, or 35 to 37 and the respective transition regions 38, 39, and 40 are oriented relative to each other such that the side angle $\gamma_3$ is substantially larger than the side angles $\gamma_1$ and $\gamma_2$ As shown in FIGS. 9a and 9b the width of the transition region 38 gets smaller from the cutting edge 11 to a width $B_2$ as already described in the embodiments of FIGS. 1 to 3. In the adjacent transition region 39 the width remains constant for a certain distance before the width of the transition region 40 to the support face 21 increases to a maximum value. In contrast as shown in FIG. 9c the width of the transition region 39 increases from the dimension $B_2$ continuously to a dimension $B_4$ while the width of the transition region 40 increases from $B_4$ to $B_1$. Here the width dimension in the transition region 40 increases more than in the transition region 39 so that there is no continuous uniform widening of the transition region toward the support face but instead a step-wise continuous widening with intermediate steps in the widening amount.

We claim:

1. A polygonal cutting insert formed with a polygonal cutting face;

an opposite support face generally congruent and generally parallel to the cutting face;

a plurality of generally planar side faces extending generally transversely between the cutting and support faces and meeting at corners the side faces and corners defining a cutting edge at a periphery of the cutting faces each side face being formed by at least two side-face regions extending parallel to each other and to the cutting and support faces and forming respective different side angles with the cutting face; and respective corner surfaces extending between the cutting and support faces at the corners and each extending between a respective pair of side faces, each corner surface having a predetermined width that is greatest at the support face.

2. The polygonal cutting insert defined in claim 1 wherein the widths of the corner surfaces increase uniformly from the cutting face to the support face.

3. The polygonal cutting insert defined in claim 1 wherein the widths of the corner surface is constant over a predetermined distance from the cutting face.

4. The polygonal cutting insert defined in claim 3 wherein the distance is at least 20% of a transverse distance between the cutting face and support face.

5. The polygonal cutting insert defined in claim 3 wherein the distance is between 2 mm and 2.5 mm.

6. The polygonal cutting insert defined in claim 1 wherein the width at the support face is 1.1 to 3 times a minimum width of the respective corner surface.

7. The polygonal cutting insert defined in claim 1 wherein each corner surface is rounded and has a constant radius of curvature.

8. The polygonal cutting insert defined in claim 7 wherein each corner surface merges smoothly into the respective side faces.

9. The polygonal cutting insert defined in claim 1 wherein each corner surface has a central generally planar land and a pair of rounded edges at which it meets the respective side faces.

10. The polygonal cutting insert defined in claim 1 wherein each corner surface has a central concave region and a pair of flanking convex regions merging with the respective side faces.

11. The polygonal cutting insert defined in claim 1 wherein the side angles lie between 5° and 40°.

12. The polygonal cutting insert defined in claim 1 wherein the side angles of the side-face regions adjacent the cutting face are between 5° and 10° and the side angles of the side-face regions adjacent the support face are between 10° and 20°.

13. The polygonal cutting insert defined in claim 1 wherein each side face has a third central side-face region having a respective side angle of between 20° and 45°.

14. The polygonal cutting insert defined in claim 1 wherein the side faces form at at least one of the corners an angle of at most 80°.

15. The polygonal cutting insert defined in claim 1 wherein the cutting face is formed adjacent the cutting edge with a chip-shaping groove and in each corner with raised chip-shaping elements.

* * * * *